Sept. 16, 1958      J. B. COX      2,852,048
SAW CHAIN WITH REMOVABLE CUTTER TEETH
Filed July 21, 1953      2 Sheets-Sheet 1
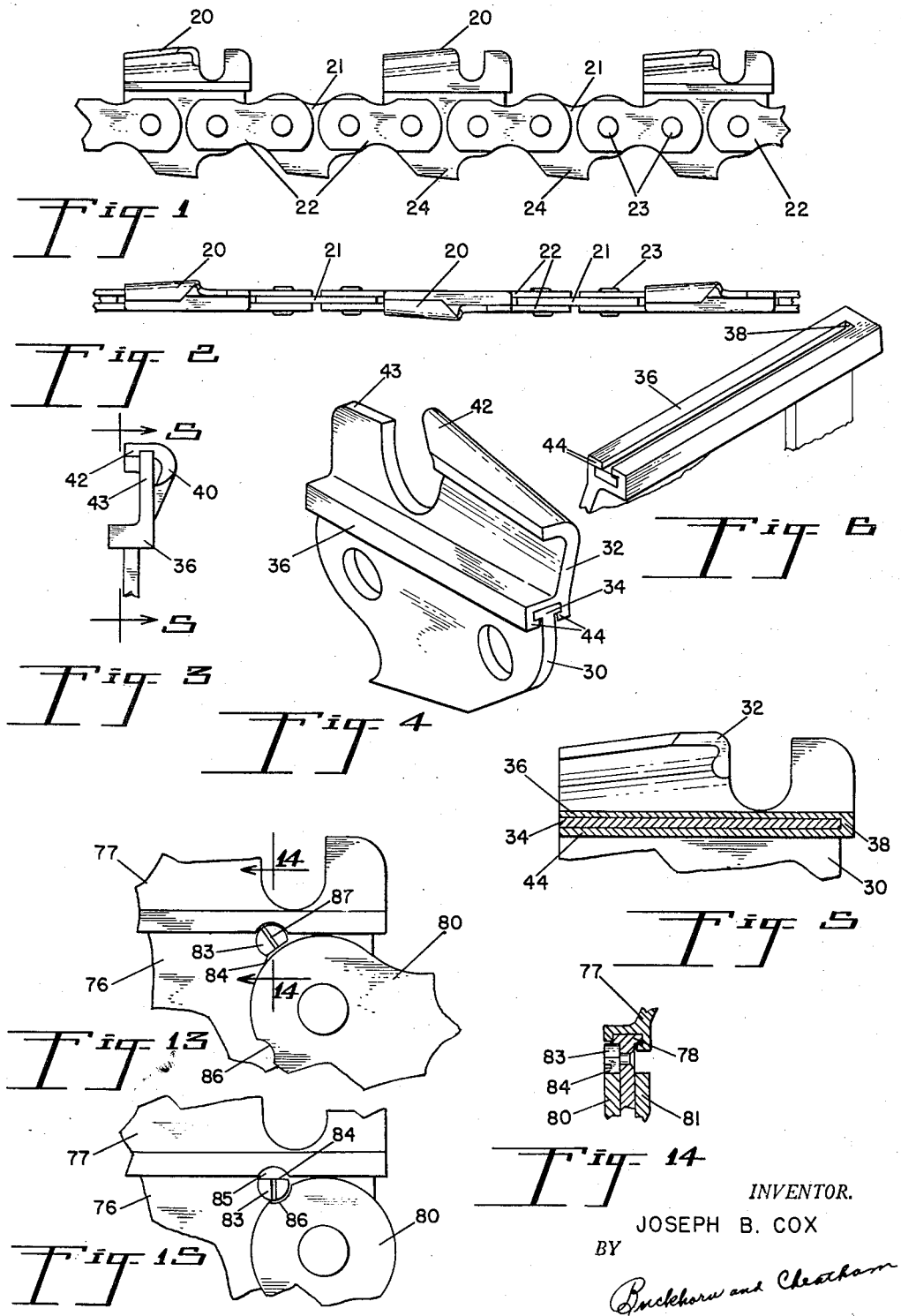
INVENTOR.
JOSEPH B. COX
BY
ATTORNEY Sept. 16, 1958 J. B. COX 2,852,048
SAW CHAIN WITH REMOVABLE CUTTER TEETH
Filed July 21, 1953 2 Sheets-Sheet 2
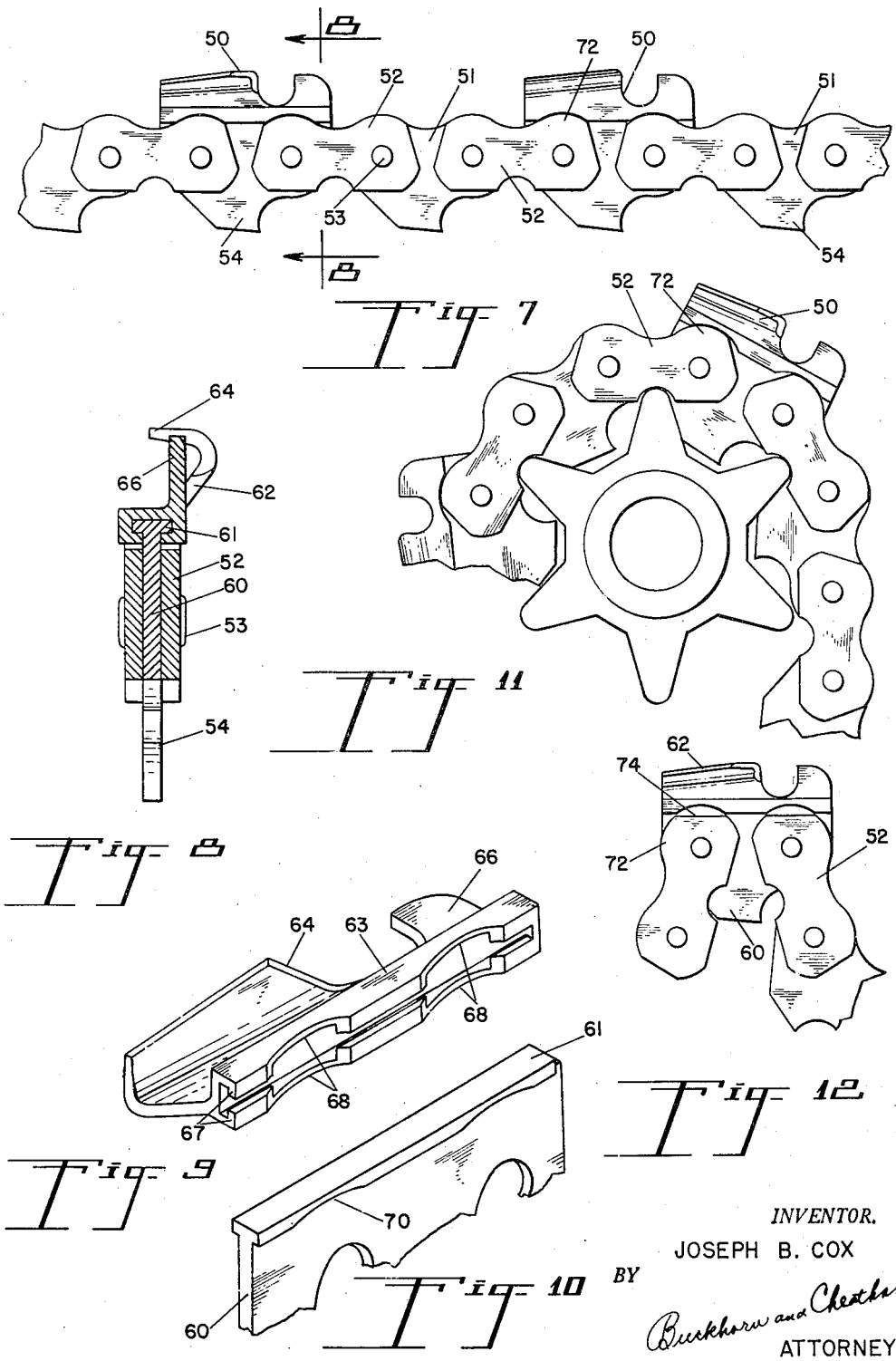
INVENTOR.
JOSEPH B. COX
BY
Buckhorn and Cheatham
ATTORNEYS

United States Patent Office 2,852,048
Patented Sept. 16, 1958

2,852,048

SAW CHAIN WITH REMOVABLE CUTTER TEETH

Joseph B. Cox, Portland, Oreg., assignor, by mesne assignments, to Omark Industries, Inc., a corporation of Oregon Application July 21, 1953, Serial No. 369,363

13 Claims. (Cl. 143—135)

The present invention relates to saw chains and more particularly to a new and novel arrangement for removably mounting cutter teeth upon links of the chain. While the mounting arrangement of the invention is particularly adapted for mounting the cutter teeth of wood sawing chains, it will become apparent as the description proceeds that it is also applicable to saw chains for cutting minerals and like materials.

Removable cutter teeth for wood saw chains have been proposed heretofore but because of their high cost or structural disadvantages, they have not been feasible. Accordingly, it is a principal object of the present invention to provide a simple arrangement for removably mounting a cutter element on a saw chain link and which permits of the manufacture of the cutter element and link at a relatively low cost.

Loggers and other persons owning chain saws have found that the power plant of the saw is well adapted to provide motive power for various devices such as winches, post hole augers and the like. However, to use such devices it is necessary to remove the saw chain and saw bar from the motor and at other times it is necessary to replace one saw chain with another which has greater cutting efficiency for the work at hand. Obviously if the removable cutter element is not positively secured to the chain link in some manner, but is only held thereon by frictional engagement between certain parts, the cutter elements may very well become dislodged as the loose chain is moved about and fall off of the chain links to which they are normally secured.

It is another important object of the invention, therefore, to provide means on a chain link which will preclude removal of the cutter elements of the chain from the respective chain links except upon manipulation of the chain links to a predetermined inoperative position relative to one another.

Still another object of the invention is to provide a saw chain having removable cutter elements in which the elements are so proportioned so as to decrease the wear upon the various parts of the chain without decreasing the cutting efficiency thereof.

Other objects and advantages of the invention will become more apparent hereinafter.

In accordance with an illustrated embodiment of the invention, there is provided a saw chain link including a body element and a removable cutter element. The body element is formed with a T-shaped edge adapted to be slidably received within a T-shaped slot formed in the base of the cutter element. The body element is pivotally connected to succeeding chain links by overlapping side plates each of which includes a portion engaging the cutter element to prevent removal thereof in the normal, operative, relative pivotal position between the body element and side plates, said portion disengaging the cutter element upon relative pivotal movement of a side plate to a predetermined inoperative position whereby the cutter element may be removed from the chain link body portion.

For a more complete description of the invention, attention is directed to the following description taken in connection with the accompanying drawings, wherein:

Fig. 1 is a side elevation of a saw chain constructed in accordance with one form of the present invention;

Fig. 2 is a top plan view of the chain of Fig. 1;

Fig. 3 is an enlarged, front elevation of a saw chain link incorporated in the saw chain of Fig. 1;

Fig. 4 is a perspective view of the link shown in Fig. 3;

Fig. 5 is a cross-sectional view taken along line 5—5 of Fig. 3;

Fig. 6 is a fragmentary, perspective view of a separable cutter element showing certain details of the construction thereof;

Fig. 7 is a side elevation of a saw chain constructed in accordance with a second modification of the invention;

Fig. 8 is an enlarged, cross-sectional view taken substantially along line 8—8 of Fig. 7;

Fig. 9 is a perspective view of a portion of a chain link of the modification shown in Fig. 7;

Fig. 10 is a perspective view of a further portion of a chain link of the second modification;

Fig. 11 is a side elevation of the saw chain of the second modification showing the chain passing about the driving sprocket of a chain saw;

Fig. 12 is a side elevation of a fragmentary portion of a chain of the second modification illustrating a further feature thereof;

Fig. 13 is a fragmentary side elevation of a saw chain link showing a third modification of the invention;

Fig. 14 is a cross-sectional view taken substantially along line 14—14 of Fig. 13; and Fig. 15 is a further side elevation of the saw chain link of Fig. 13 illustrating further features thereof.

Referring first to Figs. 1 and 2, the saw chain of the invention comprises a plurality of centrally disposed, longitudinally spaced apart alternate cutter links 20 and spacer links 21. The cutter links 20 and spacer links 21 are connected together by pairs of intermediate side links or plates 22 disposed on opposite sides of the center links 20, 21 and pivotally secured thereto by means of rivets 23. The cutter links 20 and spacer links 21 are each provided with a sprocket engaging root 24 depending from the lower edge thereof and adapted to slide within the groove of the saw bar of a chain saw.

Referring now more particularly to Figs. 3, 4, 5 and 6, the cutter links 20 comprise a link or body element 30 upon which is removably mounted a cutter tooth element 32. One edge of the body element is provided with a T-shaped head 34. The cutter element 32 comprises an elongate base portion 36 having a longitudinally extending T-shaped slot formed therein adapted to receive cooperatively the body element head 34. This slot extends from the rearward end of the cutter base portion but terminates short of the forward end thereof to define a stop 38 against which the body element engages to drive the cutter element 32 during operation of the saw. The cutter element 32 is illustrated with a cutting edge defining portion including a reversely curved shank portion 40 extending upwardly from one edge of the base portion 36 and a toe portion 42 extending from the shank 40 back over the base portion 36, the toe portion being slanted downwardly toward the rear end of the tooth. The forward edge of the shank and toe portions are provided with a continuous cutting edge. Formed on the forward edge of the cutter element base portion 36 is a depth gauge 43 for limiting the depth of cut of the cutting edge. Such a reversely curved tooth is the subject of my United States Patent 2,508,784, issued May 23, 1950.

To preclude accidental removal of the cutter elements 32 from the body elements 30, their interlocking portions should fit rather snugly, but not so tightly that the elements may not be assembled and disassembled by simple hand tools. It should be noted that the top surface of the body element head 34 is in snug contact with the adjacent surface of the cutter element slot over a relatively wide area extending a substantial distance on each of the opposite sides of the central longitudinal plane of the tooth whereby the cutter element 32 is stabilized against transverse rocking movement in respect to the body element 30 and wear between the parts is minimized. It will be realized that it would be difficult to form the body element 30 without a slight fillet in the corners between the flanges of the head 34 and the body of the element, and to accommodate such fillets the cutter element 32 is preferably formed with the opening between the lips 44 of slightly greater width than the leg of the body portion as most clearly seen in Fig. 4.

In the previously described embodiment of the invention, the cutter element is not locked positively to the body element of the link, certain disadvantages of which have been previously mentioned. A positively locked cutter element is of a distinct advantage for other reasons. For example, in bucking logs, that is in cutting a long log into shorter lengths, the log frequently bends downwardly at the point of cut to pinch the saw bar and saw chain in the kerf thereby causing the chain saw motor to stall. It is impossible to start the saw without first removing the saw bar and chain from the kerf, which is accomplished by driving wedges into the cut above the saw bar and then withdrawing the saw bar. The cutter elements will invariably drag or catch upon the sides of the kerf as the bar is withdrawn with the result that the teeth which are being dragged through the kerf backwards relative to their driven movement may slide off of the links on which they are mounted. In accordance with the following modifications of the invention, adjustable means are provided for positively securing the cutter element upon the chain saw link in the operative condition of the chain whereby the cutter elements may be removed only after first positioning the chain link elements in a predetermined inoperative position relative to one another. Referring first to Figs. 7 to 12, inclusive, a preferred arrangement for mounting removable cutter elements upon a saw chain is shown. The saw chain of this modification is similar in many respects to the saw chain as described in connection with Fig. 1 and comprises a plurality of centrally disposed, longitudinally spaced apart alternate cutter links 50 and spacer links 51. The cutter links 50 and spacer links 51 are connected together by means of pairs of intermediate links or side plates 52 disposed on opposite sides of the center links and pivotally secured thereto by means of rivets 53. The cutter links and spacer links include a sprocket engaging root 54 depending from the lower edge thereof.

As most clearly shown in Figs. 8, 9 and 10, the cutter links 50 comprise a body element 60 formed with a T-shaped head 61 upon which is removably mounted a cutter element 62. The cutter element 62 includes an elongate base portion 63 formed with a longitudinally extending T-shaped slot adapted to receive cooperatively the body element head 61, and a reversely curved cutting edge defining portion 64 and a depth gauge 66 spaced forwardly thereof. Referring now more particularly to Figs. 9 and 12, each of the lips 67 which define the T-shaped slot of the base portion 63 is provided with a pair of longitudinally spaced, arcuate recesses 68 coaxial with the rivets 53 which pass through the body element of the cutter link. The juxtaposed portions of the flanges of the head 61 are also recessed coaxially of the rivets 53 as indicated by the numeral 70 in Fig. 10. The side plates 52 are of an irregular, peripheral configuration in side elevation, the ends of the plates including a portion 72 adapted to extend into the recess contiguous thereto in the normal operable condition of the chain as shown in Figs. 7 and 11. Preferably the portion 72 is formed with an arcuate periphery coaxial with the rivet in that end of the plate and of sufficient radius whereby the spacer link portion 72 protrudes into the adjacent recess a substantial distance whereby the cutter element 62 is locked to the body element 60 to prevent accidental removal of the cutter element from the link.

Referring now more specifically to Fig. 12, the side plates 52 are formed with a flattened end portion 74 adjacent the arcuate portion 72 whereby when a side plate is pivoted to the relative inoperative position shown in Fig. 12, all portions of the side plate are removed from the adjacent recesses of the body element flanges and cutter element lips. With the side plates 52 thus positioned, the cutter element 62 may be moved longitudinally of the body element 60 to remove it from the link and a new cutter element substituted therefor.

An additional advantage resulting from the recessing of the cutter element lips and body element flanges is that the cutting edge of the cutter element 62 may be spaced relatively closer to the line through the axes of the rivets 53 as compared to the spacing between the corresponding portions of the links of the previously described embodiment, without reducing the clearance between the cutting edge and the base portion of the cutter element, or without reducing the thickness of the flanges of the body element head 61 or the lips 67 of the cutter element. This, of course, will reduce the torque arm between the cutting edge and the various portions of the link whereby the rate of wear of the various chain parts will be lessened.

In Figs. 13, 14 and 15 still another arrangement is shown for locking in place a removably mounted cutter link element. The cutter link of the present embodiment is quite similar to those of the previously described embodiments and only a fragmentary portion of the link is shown. The cutter link comprises a body element 76 and a cutter element 77, the body element being formed with a T-shaped head 78 which fits cooperatively within a T-shaped slot formed in the base portion of the cutter element. The cutter link is adapted to be connected to the preceding chain link member by a pair of side links or plates 80, 81. Mounted on the body element 76 for rotation about its axis is a locking pin having an enlarged head 83 which is flattened on one side as indicated at 84. The shank of the locking pin is spaced slightly below the plane of the lower edges of the lips of the cutter element slot and is also spaced a slight distance from the substantially circular end of the side plates 80, 81, the pin being pivotal or rotatable about its axis. The cutter element lip adjacent the locking pin is provided with a coaxial recess 85 into which the rounded portion of the locking pin head 83 is adapted to fit in the normal, operative condition of the chain. It will be observed that with the locking pin thus positioned as shown in Fig. 13, the cutter element 77 is restrained against detachment from the body element 76. The locking pin is so positioned and the head thereof so proportioned that the flat side 84 thereof is closely adjacent the periphery of the side plate end portion during the normal operative condition of the chain whereby the pin cannot be turned about its axis.

The side plate 81 is provided with a recess or notch 86 which, upon pivoting of the side plate to a predetermined, inoperative position in respect to the body element 76, is positioned coaxially of the locking pin whereby the rivet may be turned to position the flat side thereof parallel to the plane of the lower surface of the cutter element lips as shown in Fig. 15, and in which position the flat side 84 is positioned a slight distance below the lips whereby the cutter element may be slidably removed from the body element 76. After replacement of the cutter element, the locking pin may be returned to the relative position shown in Fig. 13 whereby the side plate 80 may be moved to its normal operative position. To facilitate turning of the locking pin, it may be provided with a slot 87 for receiving a screw driver or like tool. While the rivet is shown as having only one head, it should be understood that the locking pin may be provided with similar heads on each of its opposite ends and both sides of the link and side plates recessed in the manner shown. Also, a similar arrangement could be provided to operate with the side plates which connect the link to the next succeeding link of the chain.

Having illustrated and described preferred embodiments of the invention, it should be apparent to those skilled in the art that the invention permits of further modifications in arrangements and details. I claim as my invention all such modifications as come within the true spirit and scope of the appended claims.

I claim:

1. A saw chain comprising a link plate, a cutter element removably mounted on said link plate by a sliding movement longitudinally of said link plate, and adjustable means secured to said link plate and engaging said cutter element intermediate the ends of said cutter element and being positively effective in the operative condition of said chain to secure said element to said link plate against removal from said link plate.

2. A saw chain comprising a link plate, a cutter element removably attached to said link plate by a sliding movement longitudinally of said link plate, and a member pivotally attached to said link plate and having a portion engaging said cutter element intermediate the ends of said cutter element and being positively effectual in the operative condition of said chain for restraining said element against detachment from said link plate.

3. A saw chain comprising a link element, a cutter element, cooperating interengaging means on said link element and said cutter element for removably mounting said cutter element on said link element by a sliding movement longitudinally of said link element, and adjustable means secured to one of said elements and positioned intermediate the ends of said link element for locking said elements against disengagement, said adjustable means being adjustable only in a predetermined inoperative condition of said saw chain.

4. In a saw chain, a link, a cutter element, cooperating interengaging means on said link and said element for removably mounting said element upon said link by a sliding movement longitudinally of said link element, and locking means secured to said link and positioned intermediate the ends of said link for precluding disengagement of said interengaging means in the operative condition of said chain, said locking means being adjustable to a non-locking position in a predetermined inoperative condition of said chain.

5. In a saw chain, a pair of pivotally connected links, a removable cutter element removably mounted on one of said links by sliding movement longitudinally of said one link, and adjustable means comprising a portion of the other of said links positioned intermediate the ends of said one link and being positively effective in the operative condition of said chain to restrain said cutter element against sliding movement relative to said one link and adjustable to a non-restraining position upon relative pivotal movement of said links to a predetermined inoperative condition whereby said cutter element may be removed from said one link.

6. A saw chain including a link element, a cutter element, cooperating interengaging means on said link element and said cutter element for removably mounting said cutter element on said link element by a sliding movement longitudinally of said link element, means on one of said elements positioned intermediate the ends of said link element and movable to a predetermined position during the inoperative condition of said saw chain to permit interengagement of said means, said adjustable means automatically assuming positions other than said predetermined position during operative condition of said saw chain to prevent disengagement of said means.

7. A saw chain comprising a pair of pivotally connected links, a cutter element removably mounted on one of said links by a sliding movement longitudinally of said one link, the other of said links including a portion positioned intermediate the ends of said one link and normally engaging said element to prevent removal thereof from said one link.

8. A saw chain comprising a plurality of longitudinally spaced apart links including a cutter link comprising a body element and a cutter element removably mounted thereon and adapted to be moved longitudinally relative to said body element for removal therefrom, a side plate for pivotally connecting said body element to the next adjacent of said links, said side plate and cutter element including cooperative means interengaging in the operative condition of said chain to prevent movement of said cutter element relative to said body element, and disengaging upon movement of said side plate to a predetermined inoperative position whereby said cutter element may be removed from said body element.

9. A saw chain comprising a pair of overlapping, pivotally connected links, a cutter element slidably mounted on one of said links and including a base portion having an arcuate recess coaxial with the pivotal axis of the other of said links, said other link including an edge portion extending into said recess in the normal operative position of said links to prevent removal of said cutter element from said one link, said edge portion being removable from said recess upon relative pivotal movement of said links to a predetermined inoperative position.

10. A saw chain comprising a pair of longitudinally spaced apart links including a cutter link, and a pair of oppositely disposed side plates for connecting said links, said cutter link comprising a substantially flat body element, a rivet extending transversely through said side plates and body element and pivotally connecting the same, said body element having longitudinally extending, oppositely disposed flanges along one edge thereof to define a T-shaped head, said cutter link comprising a cutter element including an elongate base portion having a longitudinally extending key slot formed therein adapted slidably to receive said head, the surface of each of the key slot lips adjacent the side plates being provided with an arcuate recess coaxial with said rivet, each of said side plates including a relatively short interengaging edge portion extending into the corresponding recess when the side plate is in the normal operative position with respect to said cutter link but removed therefrom when said side plates are pivoted to a predetermined inoperative position relative to said cutter link.

11. A saw chain comprising a pair of overlapping pivotally connected links, a cutter element, cooperative interengaging means on one of said links and said cutter element for removably mounting said cutter element on said one link by sliding movement longitudinally of said one link, means positioned intermediate the ends of said one link and interlocking with said cutter element when said links are in the normal operative position of said links to prevent disengagement of said interengaging means, said interlocking means being movable to non-interlocking position upon a pivotal relative movement of said links to a predetermined inoperative position.

12. A saw chain comprising a pair of overlapping pivotally connected links, a cutter element, cooperative interengaging means on one of said links and said cutter element for slidably mounting said cutter element on said one link for sliding movement longitudinally of said one link, means carried by one of said links for interlocking with said cutter element at a position intermediate the ends of said cutter element when said links are in the normal operative position of said links to prevent sliding movement of said cutter element relative to said one link, said interlocking means being movable to non-interlocking position relative to said cutter upon pivotal relative movement of said links to a predetermined inoperative position.

13. A saw chain comprising a pair of overlapping pivotally connected links, a cutter element, cooperative interengaging means on one of said links and said cutter element for removably mounting said cutter element on said one link by a sliding movement longitudinally of said one link, means carried by the other of said links for interlocking with said cutter element at a position intermediate the ends of said cutter element when said links are in the normal operative position of said links to prevent disengagement of said interengaging means, said interlocking means being movable to non-interlocking position upon a pivotal relative movement of said links to a predetermined inoperative position.

References Cited in the file of this patent

UNITED STATES PATENTS

| | | |
|---|---|---|
| 57,088 | Clemson | Aug. 14, 1866 |
| 279,781 | Magaw | June 19, 1883 |
| 458,120 | Rogers et al. | Aug. 18, 1891 |
| 677,095 | Nagel | June 25, 1901 |
| 1,979,001 | Kankos | Oct. 30, 1934 |
| 2,508,784 | Cox | May 23, 1950 |
| 2,575,980 | Simmons | Nov. 20, 1951 |
| 2,583,243 | Tweedie | Jan. 22, 1952 |
| 2,664,120 | Hinkley | Dec. 29, 1953 |
| 2,749,950 | Jamieson et al. | June 12, 1956 |